(12) United States Patent
Tsumura et al.

(10) Patent No.: US 11,573,538 B2
(45) Date of Patent: Feb. 7, 2023

(54) LAYER CONFIGURATION PREDICTION METHOD AND LAYER CONFIGURATION PREDICTION APPARATUS

(71) Applicants: MIMAKI ENGINEERING CO., LTD., Nagano (JP); NATIONAL UNIVERSITY CORPORATION CHIBA UNIVERSITY, Chiba (JP)

(72) Inventors: Norimichi Tsumura, Chiba (JP); Junki Yoshii, Chiba (JP); Keita Hirai, Chiba (JP); Wataru Arai, Nagano (JP)

(73) Assignees: MIMAKI ENGINEERING CO., LTD., Nagano (JP); NATIONAL UNIVERSITY CORPORATION CHIBA UNIVERSITY, Chiba (JP)

( * ) Notice: Subject to any disclaimer, the term of this patent is extended or adjusted under 35 U.S.C. 154(b) by 0 days.

(21) Appl. No.: 16/831,777

(22) Filed: Mar. 26, 2020

(65) Prior Publication Data
US 2020/0310366 A1 Oct. 1, 2020

(30) Foreign Application Priority Data
Mar. 28, 2019 (JP) .............................. JP2019-063003

(51) Int. Cl.
*B33Y 10/00* (2015.01)
*G05B 13/02* (2006.01)
(Continued)

(52) U.S. Cl.
CPC ........ *G05B 13/0265* (2013.01); *B29C 64/112* (2017.08); *B29C 64/393* (2017.08);
(Continued)

(58) Field of Classification Search
None
See application file for complete search history.

(56) References Cited

U.S. PATENT DOCUMENTS 5,155,558 A * 10/1992 Tannenbaum ......... G01N 21/57
348/128
2010/0188660 A1* 7/2010 Palumbo ................ G01N 21/49
356/432
(Continued)

FOREIGN PATENT DOCUMENTS

JP 2015071282 4/2015
WO 2017019100 2/2017
(Continued)

OTHER PUBLICATIONS

"Search Report of Europe Counterpart Application", dated Sep. 2, 2020, p. 1-p. 8.

*Primary Examiner* — Mohammad M Ameen
(74) *Attorney, Agent, or Firm* — JCIPRNET

(57) ABSTRACT

A layer configuration prediction method is provided and includes: a specimen production step of producing multiple specimens by depositing layers of a material in configurations different from each other; a specimen measurement step of performing, on each specimen, measurement to acquire a texture parameter corresponding to a texture; a learning step of causing a computer to perform machine learning of a relation between each of the specimens and the texture parameter; a setting parameter calculation step of calculating a setting parameter corresponding to the texture set to a computer graphics image; and a layer configuration acquisition step of providing the setting parameter as an input to the computer having been caused to perform the machine learning, and acquiring an output representing the layering pattern of layers of the material corresponding to the setting parameter.

8 Claims, 9 Drawing Sheets

(51) Int. Cl.
  *B33Y 50/02* (2015.01)
  *B29C 64/112* (2017.01)
  *B29C 64/393* (2017.01)
  *G06N 20/00* (2019.01)
  *G06N 5/04* (2023.01)

(52) U.S. Cl.
  CPC .............. *B33Y 10/00* (2014.12); *B33Y 50/02* (2014.12); *G06N 5/04* (2013.01); *G06N 20/00* (2019.01); *B29K 2995/0021* (2013.01)

(56) References Cited

U.S. PATENT DOCUMENTS

| | | | |
|---|---|---|---|
| 2017/0217103 A1* | 8/2017 | Babaei | H04N 1/60 |
| 2017/0368746 A1* | 12/2017 | Lee | B29C 64/118 |
| 2018/0141324 A1* | 5/2018 | Tasti | B33Y 10/00 |
| 2018/0250883 A1* | 9/2018 | Nagahari | B29C 64/112 |

FOREIGN PATENT DOCUMENTS

| | | |
|---|---|---|
| WO | 2018194631 | 10/2018 |
| WO | WO-2018-194631 A1 * | 10/2018 |

\* cited by examiner (SURFACE SKIN)
| C | M | Y | K |
|---|---|---|---|
| 0 | 31.5 | 35 | 0 |
| 0 | 27 | 30 | 0 |
| 0 | 22.5 | 25 | 0 |
FIG. 3A
(INNER SKIN)
| C | M | Y | K |
|---|---|---|---|
| 15 | 100 | 20 | 0 |
| 0 | 100 | 60 | 10 |
| 20 | 100 | 50 | 0 |
| 0 | 95 | 35 | 0 |
| 0 | 75 | 35 | 10 |
| 0 | 85 | 85 | 0 |
| 0 | 100 | 100 | 0 |
| 0 | 100 | 100 | 10 |
| 0 | 100 | 65 | 40 |
| 60 | 100 | 80 | 30 |
FIG. 3B
FIRST LAYER 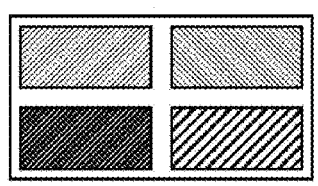 ⇨ ··· ⇨ TENTH LAYER 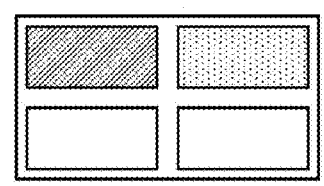
FIG. 3C

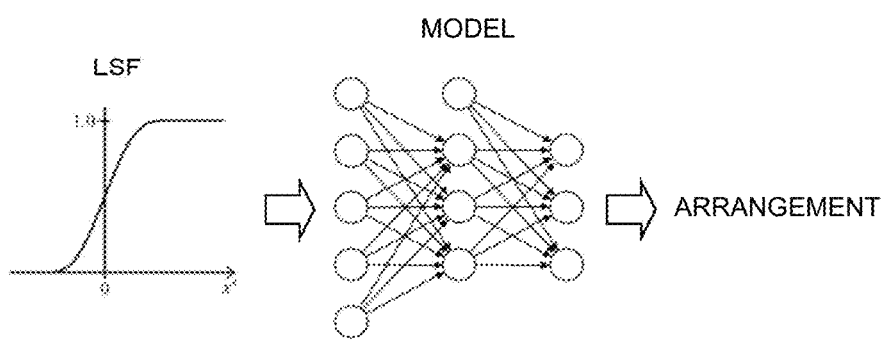
FIG. 6A
| LAYER NUMBER | 1 | 2 | 3 | 4 | 5 | 6 | 7 | 8 | 9 | 10 |
|---|---|---|---|---|---|---|---|---|---|---|
| COLOR NUMBER | 1 | 3 | 3 | 3 | 3 | 5 | 5 | 5 | 5 | 5 |
FIG. 6B
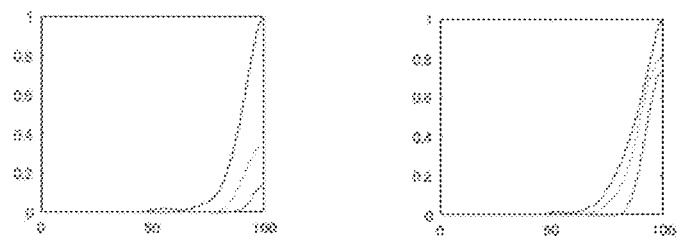
FIG. 6C

LAYER CONFIGURATION PREDICTION METHOD AND LAYER CONFIGURATION PREDICTION APPARATUS

CROSS REFERENCE TO RELATED APPLICATIONS

This application claims the priority benefit of Japanese Patent Application No. 2019-063003, filed on Mar. 28, 2019. The entirety of the above-mentioned patent application is hereby incorporated by reference herein and made a part of this specification.

TECHNICAL FIELD

The present invention relates to a layer configuration prediction method and a layer configuration prediction apparatus.

BACKGROUND ART

Conventionally, a building apparatus (3D printer) configured to build an object by using an inkjet head has been known (for example, refer to Patent Literature 1). In such a building apparatus, for example, the object is built by additive manufacturing of layering a plurality of ink layers formed by the inkjet head.

Patent Literature 1: Japanese Unexamined Patent Publication No. 2015-071282

SUMMARY

When an object is built by a building apparatus, the texture of the object can differ in some cases, depending on the layering pattern of regions (for example, ink layers) formed of a building material (for example, ink). For example, when a plurality of mutually different kinds of ink are used as the building material and regions of various colors are layered on each other to express a color, texture such as transparent appearance at the surface of the object can differ in some cases, depending on the layering pattern of the regions.

Thus, in such a case, it is desired that the object is built so that the regions of the building material are layered on each other in a configuration with which texture desired by a user (for example, a designer) can be obtained. To achieve this, it is desired that, for example, the configuration with which the desired texture can be obtained is appropriately predicted for the layering pattern (layer configuration) of the building material. Thus, the present invention is intended to provide a layer configuration prediction method and a layer configuration prediction apparatus that can solve the above-described problem.

In building of an object, normally, a trial-and-error process needs to be performed by, for example, actually building the object to determine a layer configuration with which desired texture can be obtained. However, it takes a long time to build the object, and thus the amount of work for determining the layer configuration largely increases when such a trial-and-error process is needed.

Instead of repeating a trial-and-error process at each building of an individual object, the inventors of the present application have thought of causing a computer to perform machine learning of the relation between the layer configuration and texture in advance and inputting desired texture to cause the computer to output the corresponding layer configuration. More specifically, in this case, the inventors of the present application have thought of producing a plurality of specimens in which layers of a building material are deposited in configurations different from each other, performing measurement corresponding to predetermined texture on each specimen to acquire the relation between the layer configuration and texture, and causing the computer to perform machine learning of the relation. In addition, through various experiments and the like actually performed, the inventors of the present application have found that the layer configuration corresponding to the desired texture can be appropriately predicted by such a method.

Through further diligent research, the inventors of the present application have found features necessary for obtaining such effects and reached the present invention. To solve the above-described problem, the present invention provides a layer configuration prediction method of predicting a layering pattern of layers of a building material to express texture set to a computer graphics image representing an object to be built by a building apparatus configured to build the object by depositing layers of the material, the layer configuration prediction method including: a specimen production step of producing a plurality of specimens by depositing layers of the material in configurations different from each other; a specimen measurement step of performing, on each specimen, measurement to acquire a texture parameter corresponding to the texture; a learning step of causing a computer to perform machine learning of the relation between each of the specimens and the texture parameter, the machine learning causing the computer to learn the layering pattern of layers of the material in each of the specimens and the texture parameter measured in the specimen measurement step in association with each other; a setting parameter calculation step of calculating, based on the computer graphics image to which the texture is set, a setting parameter as the texture parameter corresponding to the texture set to the computer graphics image; and a layer configuration acquisition step of predicting the layering pattern of layers of the material corresponding to the setting parameter, providing the setting parameter calculated at the setting parameter calculation step as an input to the computer having been caused to perform the machine learning, and acquiring an output representing the layering pattern of layers of the material corresponding to the setting parameter.

With this configuration, for example, the computer can be caused to appropriately perform machine learning related to the relation between the layering pattern of layers of the building material and texture. In addition, the output representing the layer layering pattern corresponding to the texture set to the computer graphics image can be appropriately acquired by using machine learning. Accordingly, for example, the layer layering pattern corresponding to desired texture can be appropriately predicted (estimated).

In this configuration, each specimen may be, for example, a specimen formed by depositing a plurality of colored layers of the material. In addition, in this case, each layer of the material in each specimen may be colored with a color selected from among a plurality of colors different from each other. With this configuration, for example, it is possible to appropriately produce a plurality of specimens having textures different from each other.

In this case, the color of each layer in each specimen may also be a color selected from among all colors that can be expressed in principle. However, in this case, the number of combinations of colors is enormous, and thus the amount of work of specimen production and specimen measurement can be largely increased. Thus, for the color of each layer in each specimen, a color group including only some of all colors that can be expressed may be prepared in advance, and only a color in the color group may be selected.

In this case, for example, a plurality of color groups may also be prepared. With this configuration, for example, specimens corresponding to various kinds of texture can be more appropriately produced while the amount of work of specimen production and specimen measurement is appropriately reduced by using the color groups. In addition, in this case, for example, the specimen production step prepares a plurality of color groups including a plurality of colors in combinations different from each other and selects either color in either color group as the color of each layer in each specimen. In addition, in this case, each specimen may be produced so that layers of the material to which colors in the same color group are set are layered one after another. With this configuration, for example, the relation between the color group and each layer can be easily and appropriately managed.

In this case, for example, the prepared color groups may also be associated with the up-down relation between deposition positions. The upper side in the layer up-down relation is the upper side in the deposition direction in which a plurality of layers is deposited in each specimen. The upper side can also be, for example, a side corresponding to the outside of the object. In this case, for example, the color groups include a first color group including a plurality of colors used as the colors of the layers of the material deposited on a lower side, and a second color group including a plurality of colors used as the colors of the layers of the material deposited on an upper side. In addition, for example, the specimen production step produces the specimens so that the layers of the material colored with colors in the second color group are positioned over the layers of the material colored with colors in the first color group. With this configuration, for example, the relation between each color group and each layer can be easily and appropriately managed.

In this case, colors included in each color group may also be set in accordance with a target object structure of the object to be built and the like. More specifically, for example, the specimen production step may produce the specimens expressing the color of the skin of a human being. In this case, for example, the second color group may include a plurality of colors corresponding to the color of the surface skin of the skin of a human being. For example, the first color group may include a plurality of colors corresponding to the color of the inner skin of the skin of a human being. With this configuration, for example, the specimens more appropriately expressing the color of the skin of a human being can be produced.

In this configuration, the texture may be, for example, transparent appearance expressed by depositing a plurality of layers of the material. In this case, for example, a function representing a light spreading pattern may be used as the texture parameter. With this configuration, for example, the layering pattern layer for obtaining desired transparent appearance can be appropriately predicted. More specifically, for example, a line spread function (LSF) may be used as the texture parameter. With this configuration, for example, texture corresponding to transparent appearance can be appropriately represented by the texture parameter.

After the layer layering pattern corresponding to desired texture is predicted, for example, building data representing the object to be built may be generated based on a result of the prediction. In this case, the layer configuration prediction method can further include a building data generation step of generating the building data. For example, the generated building data may be data that causes the building apparatus to deposit the building material in a layering pattern based on the layering pattern of layers of the material acquired at the layer configuration acquisition step. With this configuration, for example, the object for which desired texture can be obtained can be appropriately built by the building apparatus.

For example, a layer configuration prediction method having some of the above-described features can also be provided as a configuration according to the present invention. More specifically, for example, the layer configuration prediction method can include the setting parameter calculation step and the layer configuration acquisition step. The configuration according to the present invention may be, for example, a layer configuration prediction apparatus corresponding to such a layer configuration prediction method. In these cases as well, for example, it is possible to obtain effects same as those described above.

According to the present invention, for example, it is possible to appropriately predict a layer layering pattern corresponding to desired texture.

BRIEF DESCRIPTION OF THE DRAWINGS

FIG. 1A illustrates an exemplary configuration of the building system 10. FIG. 1B is a cross-sectional diagram illustrating an exemplary configuration of an object 50 built by a building apparatus 12. FIG. 1C illustrates an exemplary configuration of a colored region 154 of the object 50.

FIG. 2A is a cross-sectional diagram illustrating the configuration of the skin of a human being in a simplified manner. FIG. 2B illustrates an exemplary configuration of the colored region 154 used to express the texture of skin. FIG. 2C illustrates examples between the number of layers of each region included in the colored region 154 is different.

FIGS. 3A, 3B, and 3C are each a diagram for description of a specimen used in the present example. FIG. 3A illustrates an exemplary color used as the color of each ink layer included in a surface skin region 304. FIG. 3B illustrates an exemplary color used as the color of each ink layer included in an inner skin region 302. FIG. 3C is a diagram for description of an operation of layering ink layers.

FIG. 4A is a picture illustrating a specimen produced as a measurement target. FIG. 4B illustrates an exemplary input image used to set a pattern of laser beam irradiation.

FIG. 5A illustrates an LSF measurement result for one specimen. FIGS. 5B and 5C each illustrate a result obtained by performing predetermined processing on the measurement result illustrated in FIG. 5A. FIG. 5D illustrates an LSF measurement result.

FIGS. 6A, 6B, and 6C are each a diagram for description of machine learning used in the present example. FIG. 6A illustrates a model in which a layer configuration of ink layers is predicted by using the machine learning. FIG. 6B illustrates an exemplary layer configuration determined based on an output value from a neural network. FIG. 6C illustrates an exemplary layer configuration prediction result.

FIG. 8A is a flowchart illustrating an exemplary operation of causing a computer to perform the machine learning. FIG. 8B is a flowchart illustrating an exemplary operation of performing layer configuration prediction by using a result of the machine learning.

DESCRIPTION OF EMBODIMENTS

Figure 1A:
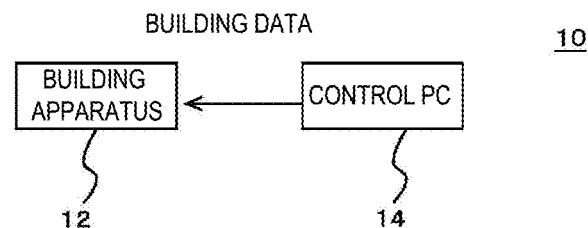
FIGS. 1A, 1B, and 1C are each a diagram for description of a building system 10 according to an embodiment of the present invention.
Figure 1B:
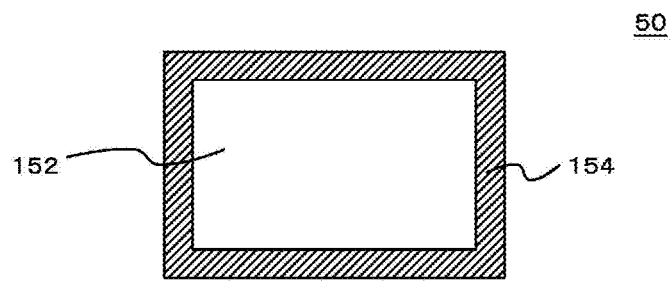
Figure 1C:
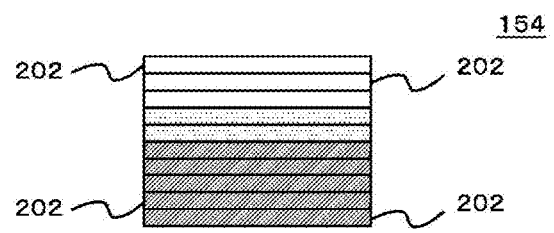

An embodiment of the present invention will be described below with reference to the accompanying drawings. FIGS. 1A, 1B, and 1C are each a diagram for description of a building system 10 according to the embodiment of the present invention. FIG. 1A illustrates an exemplary configuration of the building system 10. Hereinafter, the building system 10 may have features identical or similar to those of a publicly known building system unless otherwise stated.

In the present example, the building system 10 is a system configured to build a stereoscopic object and includes a building apparatus 12 and a control PC 14. The building apparatus 12 is a device configured to execute building of an object 50, and builds the object 50 by additive manufacturing of depositing layers of ink. In this case, the ink is, for example, functional liquid. In the present example, the ink is an exemplary building material. In other words, the ink is, for example, liquid ejected from an inkjet head. In this case, the inkjet head is, for example, an ejection head configured to eject the liquid by an inkjet scheme.

In the present example, the building apparatus 12 builds an object colored by using ink of a plurality of colors different from each other. For example, a publicly known building apparatus can be excellently used as such a building apparatus 12. More specifically, for example, a building apparatus (3D printer) manufactured by MIMAKI ENGINEERING CO., LTD. can be excellently used as the building apparatus 12. In the present example, ultraviolet curing ink or the like can be excellently used as the ink.

The control PC 14 is a computer configured to operate in accordance with a predetermined computer program and controls the operation of the building apparatus 12 by supplying, to the building apparatus 12, building data representing the object 50 to be built. More specifically, in the present example, the control PC 14 generates building data by performing setting of desired texture and the like on stereoscopic data of the shape or the like of the object to be built. In this case, the control PC 14 generates a computer graphic image (hereinafter referred to as a CG image) representing the object based on the stereoscopic data, and receives setting of texture and the like from a user such as a designer having produced the stereoscopic data while presenting the CG image to the user. Then, the control PC 14 generates building data for causing the building apparatus 12 to build the object with the set texture. The texture of the object will be described in more detail later.

FIG. 1B is a cross-sectional diagram illustrating an exemplary configuration of the object 50 built by the building apparatus 12. FIG. 1C illustrates an exemplary configuration of a colored region 154 of the object 50. As described above, in the present example, the building apparatus 12 builds the colored object 50. In this case, the object 50 includes an interior region 152 and the colored region 154 as illustrated in, for example, FIG. 1B.

The interior region 152 is a region forming the inside of the object 50 and is formed inside the object 50 while being surrounded by the colored region 154. In the present example, the interior region 152 is formed of light-reflective ink such as white ink to also function as a light-reflective region. In a modification of the configuration of the object 50, the light-reflective region may be formed separately from the interior region 152. In this case, for example, the interior region 152 can be formed with ink of an optional color. In addition, in this case, for example, the light-reflective region is formed between the interior region 152 and the colored region 154.

The colored region 154 is a region in which coloring is performed in the object 50, and is colored in various colors through formation on the surface of the object 50 in a constant thickness from the outer peripheral surface in the normal direction by using coloring ink of a plurality of colors. In this case, the surface of the object 50 is, for example, a region of the object 50, the color of which can be visually recognized from the outside. The coloring ink is, for example, ink of a cyan (C) color, a magenta (M) color, a yellow (Y) color, a black (K) color, a white (W) color, and a transparent (T) color.

In the present example, the colored region 154 has a configuration in which a plurality of ink layers 202 are layered on each other as illustrated in, for example, FIG. 1C. In this case, for example, the layers 202 can be colored in various colors to express various kinds of texture in the colored region 154. In FIG. 1C, for sake of simplicity of the drawing, the difference between the colors of the layers 202 is indicated by the difference between hatching patterns.

In the present example, the ink layers 202 can be, for example, regions having substantially constant thicknesses and spreading in directions parallel to a plane orthogonal to the thickness direction. As described above, in the present example, the building apparatus 12 builds the object 50 by the additive manufacturing. In this case, an ink layer deposited by the additive manufacturing on each of the upper and lower surface sides in the deposition direction in the additive manufacturing can be an ink layer 202 included in the colored region 154.

The colored region 154 is formed along the side surfaces of the object 50, intersecting the upper and lower surfaces, so that its thickness is constant in the normal direction. In this case, the colored region 154 has a configuration in which a plurality of layered regions along the side surfaces are layered on each other. In this case, each layered region along the side surfaces can be an ink layer 202 included in the colored region 154.

The layers 202 included in the colored region 154 are preferably formed in a constant thickness set in advance. Thus, in the present example, ink amount compensation is performed as appropriate by using clear ink as colorless and transparent ink so that no difference in the thicknesses of the layers 202 is caused due to the difference in the colors of the layers 202. For example, for a case of green at the density of 100%, the ratio of the amount of cyan (C) ink, the amount of yellow (Y) ink, and the amount of transparent (T) ink is 50%:50%:0%. For a case of red at the density of 50%, the ratio of the amount of magenta (M) ink, the amount of yellow (Y) ink, and the amount of transparent (T) ink is 25%:25%:50%. For a case of gray at the density of 5%, the ratio of the amount of black (K) ink and the amount of transparent (T) ink are 5%:95%, thereby performing compensation. The configuration of the colored region 154 of the object 50 will be described in more detail later.

Figure 2A:
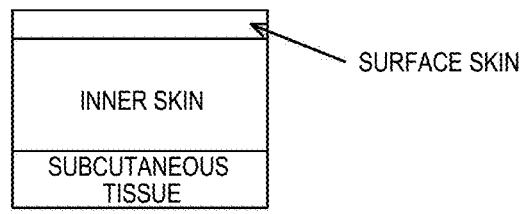
FIGS. 2A, 2B, and 2C are each a diagram illustrating exemplary texture of the object 50, which is expressed by using the colored region 154.
Figure 2B:
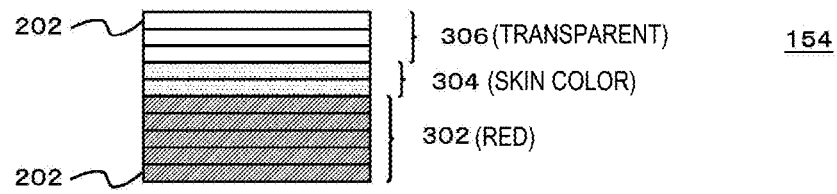
Figure 2C:
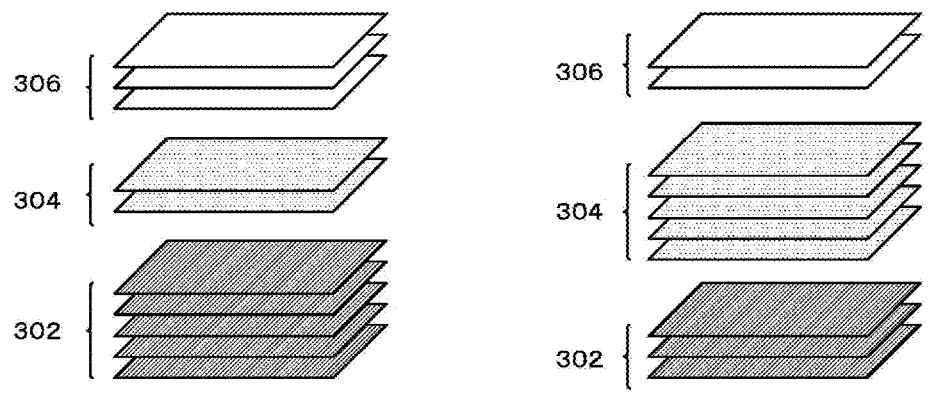

The following describe the texture of the object, which is expressed by using the colored region 154, in more detail. FIGS. 2A, 2B, and 2C are each a diagram illustrating exemplary texture of the object, which is expressed by using the colored region 154, and illustrates an exemplary configuration of the colored region 154 when the texture of the skin of a human being is expressed.

FIG. 2A is a cross-sectional diagram illustrating the configuration of the skin of a human being in a simplified manner. As illustrated in the drawing, the skin of a human being has a multi-layer structure in which the inner skin and the surface skin are layered on subcutaneous tissue. Thus, in the present example, the texture of the skin is reproduced by using the colored region 154 in which the ink layers 202 are layered on each other in a layer configuration (layer structure) representing the multi-layer structure of the skin.

FIG. 2B illustrates an exemplary configuration of the colored region 154 used to express the texture of the skin. In this case, as illustrated in the drawing, the colored region 154 includes an inner skin region 302, a surface skin region 304, and a clear region 306. The inner skin region 302 corresponds to the inner skin of the skin of a human being. The inner skin of the skin of a human being normally has a redness color due to the influence of blood flowing through blood vessels in the subcutaneous tissue or the like. Thus, in the present example, the inner skin region 302 is formed by placing a layer 202 of a reddish color. The surface skin region 304 corresponds to the surface skin of the skin of a human being. In this case, for example, the surface skin may be a region having a skin color as the color of the surface of the skin of a human being. Thus, the surface skin region 304 is formed by placing a layer 202 having a color similar to the skin color.

Transparent appearance is thought to be important in the texture of the skin of a human being. Thus, in the present example, the clear region 306 formed of clear ink is formed on (outside) the inner skin region 302 and the surface skin region 304. In this case, the clear region 306 may be formed of clear ink only. For example, the clear region 306 may also be formed by using mainly clear ink in mixture with a small amount of colored ink, depending on desired texture of the skin.

In this case, various kinds of texture can be expressed by changing the number of layers 202 included in each of the inner skin region 302, the surface skin region 304, and the clear region 306 and the color of each layer 202. FIG. 2C illustrates an example in which the number of layers is different between the regions included in the colored region 154. In the drawing, the left diagram illustrates an example in which the number of layers 202 included in the inner skin region 302 is four, the number of layers 202 included in the surface skin region 304 is two, and the number of layers 202 included in the clear region 306 is three. The right diagram illustrates an example in which the number of layers 202 included in the inner skin region 302 is three, the number of layers 202 included in the surface skin region 304 is four, and the number of layers 202 included in the clear region 306 is two. In this manner, according to the present example, various kinds of texture can be expressed by changing the number of layers 202 included in each region and the colors thereof. Some of these regions may be omitted depending on desired texture.

When the number of layers 202 included in the colored region 154 is too large, the amount of light absorbed by each layer 202 increases and the color of the colored region 154 becomes closer to black in some cases. Thus, the total number of layers 202 in the colored region 154 is preferably about 10 or smaller. In the present example, the total number of layers 202 included in the colored region 154 is fixed to 10. Thus, when the number of layers 202 included in either region increases or decreases, the number of layers 202 included in any other region decreases or increases. With this configuration, for example, the thickness of the colored region 154 can be maintained constant when texture expressed by the colored region 154 is changed.

The color of each layer 202 included in the inner skin region 302 and the color of each layer 202 included in the surface skin region 304 may be selected from a color group prepared in advance. In this case, the color group is, for example, a group including a plurality of colors. For example, a color group used in the present example may include only some of all colors that can be expressed by the building apparatus 12 (refer to FIGS. 1A, 1B, and 1C). In this case, color groups corresponding to the respective regions may include colors in combinations different from each other. More specifically, for example, a color group including colors used for the layers 202 included in the inner skin region 302 may include a plurality of reddish colors. A color group including colors used for the layers 202 included in the surface skin region 304 may include a plurality of colors similar to the skin color.

In this manner, in the present example, various kinds of texture can be expressed by forming the colored region 154 having a configuration in which the layers 202 colored in various colors are layered on each other. However, in this case, the kinds of possible layer configurations increase, and thus it is difficult to predict which texture can be obtained with which layer configuration in some cases. As a result, for example, it can be difficult to search for a layer configuration corresponding to desired texture.

To solve these difficulties, in the present example, a layer configuration corresponding to desired texture is acquired by using a computer having performed in advance machine learning on the relation between the layer configuration and the texture. In addition, in this case, the computer is caused to perform machine learning by using results of texture measurement on specimens corresponding to various layer configurations. As described above, the texture of the object 50 expressed by using the colored region 154 is, for example, the texture of the skin of a human being. Thus, the following describes details of usage of machine learning and the like in the present example for a case in which the texture of the skin of a human being is expressed.

FIGS. 3A, 3B, and 3C are each a diagram for description of a specimen used in the present example. In this case, a specimen is used to acquire the relation between the layer configuration and the texture. In the present example, a plurality of specimens expressing the color of the skin of a human being are produced. In this case, in each produced specimen, a plurality of ink layers is deposited in a configuration similar to that of the colored region 154 in the object 50. In this case, a plurality of specimens corresponding to various layer configurations are produced by changing the color of each layer in various manners.

More specifically, in the present example, a plurality of specimens in each of which 10 ink layers are deposited are produced. Similarly to the configuration of the colored region 154 described with reference to FIGS. 2A, 2B, and 2C, the 10 layers are divided into the three kinds of regions of the inner skin region 302, the surface skin region 304, and the clear region 306. Then, ink layers included in each of the inner skin region 302 and the surface skin region 304 are colored with colors included in color groups corresponding to the respective regions.

FIG. 3A is a diagram illustrating exemplary colors used as the colors of ink layers (surface skin layers) included in the surface skin region 304, indicating the density of each of CMYK colors. For example, the colors illustrated in FIG. 3A can also be exemplary colors similar to the skin color. The colors illustrated in FIG. 3A are exemplary colors included in a color group corresponding to the surface skin region 304.

FIG. 3B is a diagram illustrating exemplary colors used as the colors of ink layers (inner skin layers) included in the inner skin region 302, indicating the density of each of CMYK colors. For example, the colors illustrated in FIG. 3B can also be exemplary reddish colors. The colors illustrated in FIG. 3B are exemplary colors included in a color group corresponding to the inner skin region 302.

In the present example, the surface skin layers included in the surface skin region 304 and the inner skin layers included in the inner skin region 302 are formed by additionally using clear ink in addition to ink of CMYK colors illustrated in the drawing. In this case, for example, similarly to formation of the colored region 154, the clear ink is used for ink amount compensation to avoid the difference in the layer thickness due to the difference in the layer colors. Similarly to the configuration of the colored region 154, in each specimen, the clear region 306 is formed on the surface skin region 304 as necessary.

In this case, as illustrated in, for example, FIG. 3C, each specimen is formed by layering ink layers. FIG. 3C is a diagram for description of an operation of layering ink layers, illustrating an exemplary ink-layer layering pattern for four kinds of specimens having layer configurations different from each other. In FIG. 3C, for sake of simplicity of the drawing, the color difference is indicated by the difference between hatching patterns to illustrate an exemplary first ink layer and an exemplary tenth ink layer.

More specifically, in this case, for example, each specimen in which a plurality of ink layers are layered on each other is produced through formation by layering the clear region 306 on the inner skin region 302 and the surface skin region 304 including layers colored with the colors indicated in FIGS. 3A and 3B. In some of the specimens, for example, any of the inner skin region 302, the surface skin region 304, and the clear region 306 may be omitted. With this configuration, for example, a specimen in which a plurality of colored ink layers is deposited can be appropriately produced. In this case, for example, it is possible to appropriately produce a plurality of specimens having textures different from each other by forming, as each layer, a layer colored with a color selected from among a plurality of colors different from each other.

As described above, in the present example, the color of each layer included in the inner skin region 302 and the surface skin region 304 is selected from among the limited kinds of colors illustrated in FIGS. 3A and 3B. With respect to the point, in principle, for example, the color of each layer in each specimen may also be selected from among all colors that can be expressed by the building apparatus 12. However, in this case, the number of combinations of colors is enormous, and thus the amount of work of specimen production and specimen measurement may be largely increased.

In the present example, however, a color group including only some of all colors that can be expressed by the building apparatus 12 is prepared in advance so that the color of each layer in each specimen is selected from among limited kinds of color as described above. With this configuration, for example, specimens corresponding to various kinds of texture can be more appropriately produced while the amount of work of specimen production and specimen measurement is appropriately reduced.

In addition, in this case, texture can be expressed more appropriately by using a color group in accordance with texture to be expressed, such as the color group corresponding to the inner skin region 302 or the color group corresponding to the surface skin region 304. In this case, colors included in each color group may be, for example, colors set in accordance with a target object structure of the object to be built and the like. In addition, in this case, the operation of a process (specimen production step) of producing a plurality of specimens may be, for example, the operation of preparing a plurality of color groups including a plurality of colors in combinations different from each other and selecting either color in either color group as the color of each layer in each specimen.

In addition, in this case, the prepared color groups are preferably associated with the up-down relation between deposition positions. In this case, the upper side in the layer up-down relation can also correspond to, for example, the outer side of the object. More specifically, when the surface skin region 304 is formed on the inner skin region 302 as in the present example, the color group corresponding to the inner skin region 302 can also be, for example, a color group including a plurality of colors used as the colors of ink layers deposited on the lower side. In the present example, the color group corresponding to the inner skin region 302 is an exemplary first color group. The color group corresponding to the inner skin region 302 can also be, for example, a color group including a plurality of colors corresponding to the color of the inner skin of the skin of a human being.

In addition, in this case, the color group corresponding to the surface skin region 304 can be, for example, a color group including a plurality of colors used as the colors of ink layers deposited on the upper side. In the present example, the color group corresponding to the surface skin region 304 is an exemplary second color group. The color group corresponding to the surface skin region 304 can also be, for example, a color group including a plurality of colors corresponding to the surface skin of the color of the skin of a human being.

In addition, when a plurality of color groups is used as in the present example, each specimen is preferably produced so that ink layers to which colors of the same color group are set are layered one after another. With this configuration, for example, the relation between a color group and a layer can be easily and appropriately managed. More specifically, in the present example, the surface skin region 304 is formed on the inner skin region 302 as described above. Such a configuration can be, for example, a configuration in which ink layers colored with colors in the color group corresponding to the surface skin region 304 are positioned over ink layers colored with colors in the color group corresponding to the inner skin region 302. According to the present example, for example, a plurality of specimens expressing the color of the skin of a human being can be appropriately produced.

Figure 4A:
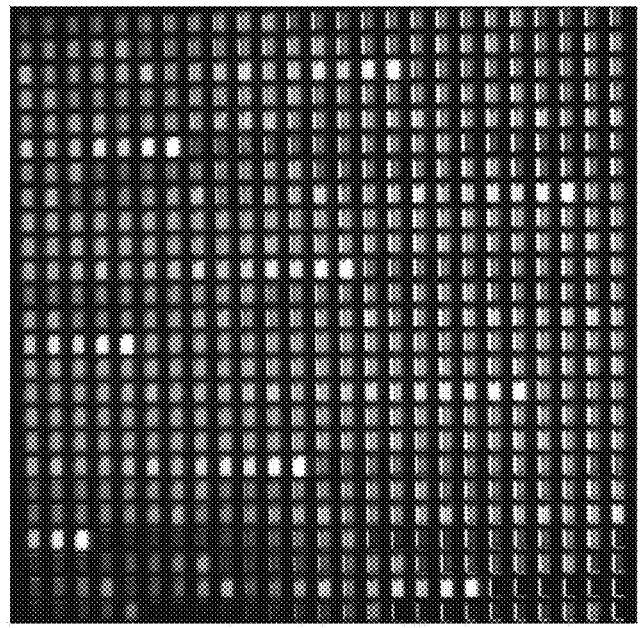
FIGS. 4A and 4B are each a diagram for description of measurement or the like performed by the inventors of the present application.
Figure 4B:
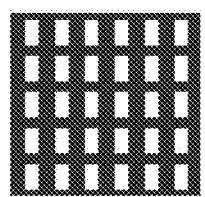

The following describe measurement or the like performed by the inventors of the present application with an actually produced specimen. FIGS. 4A and 4B are each a diagram for description of the measurement or the like performed by the inventors of the present application. FIG. 4A is a picture illustrating a specimen produced as a measurement target, and illustrates an exemplary state in which a measurement target including a plurality of patches corresponding to a plurality of specimens is irradiated with a laser beam in a predetermined pattern. FIG. 4B illustrates an exemplary input image used to set the pattern of irradiation with the laser beam.

As described above, in the present example, a computer performs machine learning by using results of texture measurement on specimens corresponding to various layer configurations. Then, in this case, as illustrated in, for example, FIG. 4A, a measurement target including a plurality of patches in which ink layers are layered on each other in configurations different from each other may be produced as a plurality of specimens. In this case, the patches correspond to the respective specimens.

More specifically, in an experiment performed by the inventors of the present application, a plurality of specimens arranged in an array as illustrated in FIG. 4A were produced. Each specimen had a side length of 1 cm and a thickness of 0.3 mm. As described above, each ink layer included in each specimen was classified into any of the three kinds of regions of the inner skin region 302, the surface skin region 304, and the clear region 306 (refer to FIGS. 2A, 2B, and 2C), and colored with a color included in a color group corresponding to the region. In addition, in this case, the number of colors included in the color group corresponding to the inner skin region 302 was 10, the number of colors included in the color group corresponding to the surface skin region 304 was three, and the number of colors included in the color group corresponding to the clear region 306 was one. Then, the number of ink layers included in each region was changed in various manners to produce a measurement target including 1875 kinds of specimens (patches). The colors indicated in FIG. 3B were used as the 10 colors included in the color group corresponding to the inner skin region 302. The colors indicated in FIG. 3A were used as the four colors included in the color group corresponding to the surface skin region 304. A clear color was used as the one color included in the color group corresponding to the clear region 306.

As described above, transparent appearance is thought to be important in the texture of the skin of a human being. Thus, in the experiment performed by the inventors of the present application, measurement of a parameter representing transparent appearance expressed by depositing a plurality of ink layers was performed as texture measurement performed on each specimen. Such a parameter may be, for example, a function representing a light spreading pattern. More specifically, in this experiment, a line spread function (LSF) was used as a texture parameter as a parameter representing the texture. In this case, the line spread function (LSF) is, for example, a function representing spread of linear light in a measurement target. In other words, the line spread function (LSF) can be, for example, a function expressing how an ideal line image spreads as passing through a target system. Measurement of the line spread function (LSF) can be excellently performed by various publicly known methods.

In the experiment performed by the inventors of the present application, the left half of each specimen was irradiated with light in a dark room by using the input image illustrated in FIG. 4B to efficiently and automatically perform measurement on a large number of specimens. In addition, in this case, a smart beam laser machine as a publicly known laser projector was used for the light irradiation. Then, images of the specimens irradiated with light were captured by using α5100 camera manufactured by Sony Corporation, as a publicly known camera. The LSF measurement was performed separately for each of RGB colors to obtain color information for each specimen.

Figure 5A:
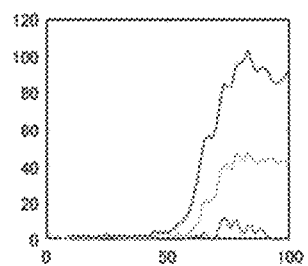
FIGS. 5A, 5B, 5C, and 5D are each a diagram for description of an LSF measurement result.

FIGS. 5A, 5B, 5C, and 5D are each a diagram for description of a result of the LSF measurement. FIG. 5A is a diagram illustrating a result of the LSF measurement on one specimen, and illustrates a result of acquisition of pixel value change from the left of the center in the right-left direction toward the right for the specimen in an image captured by the camera as described above. The three curves in the graph of the drawing represent pixel value change in RGB components.

Figure 5B:
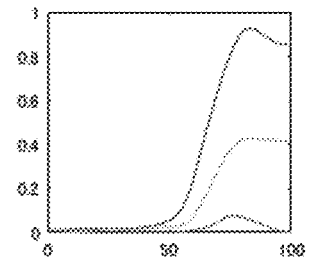
Figure 5C:
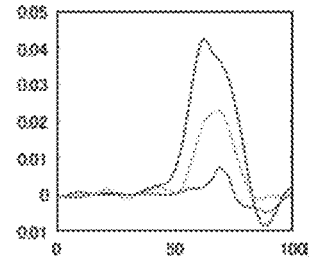

FIGS. 5B and 5C each illustrate a result obtained by performing predetermined processing on the measurement result illustrated in FIG. 5A. More specifically, FIG. 5B illustrates a result obtained by performing smoothing on the measurement result illustrated in FIG. 5A through a low-pass filter. Through the low-pass filter, for example, the influence of noise included in the pixel value in FIG. 5A can be reduced. FIG. 5C illustrates a result obtained by performing differentiation on the result illustrated in FIG. 5B. Through the differentiation in this manner, for example, information representing the gradient of transition of the pixel value can be acquired.

When LSF measurement is performed on a specimen as described above, light blurring normally can have isotropy and uniformity. However, in an actual measurement result, the transition has difference across the peak of the differential value due to noise influence and the like in some cases. Thus, in this experiment, only a result before the peak (the left side in the specimen) was used based on the assumption of LSF isotropy. In addition, in this case, smoothing was performed to remove noise in the differential value so that data having a value smaller than zero was regarded as error and the value was corrected to zero.

Since a plurality of specimens are simultaneously irradiated with light in measurement as described above, some specimen may also be irradiated with light at a position shifted from the center of the specimen. The influence of such difference needs to be taken into consideration to appropriately acquire data as the LSF. More specifically, in this experiment, the influence of the difference was removed by moving, to the right end, data before the maximum value of the differential value obtained through the above-described processing.

Figure 5D:
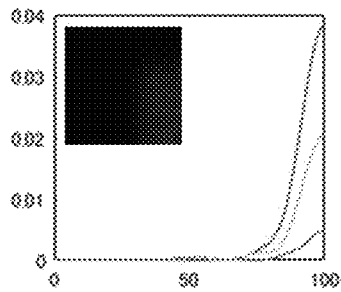
Figure 5D:
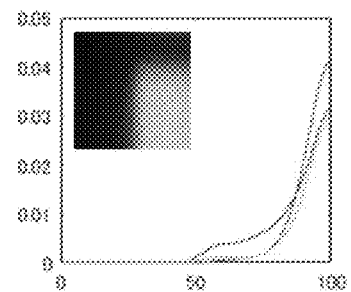

FIG. 5D is a diagram illustrating a result of the LSF measurement, and illustrates an LSF obtained by performing the above-described measurement on each of two kinds of specimens, together with the picture of the specimen. Among the results illustrated in FIG. 5D, the right diagram illustrates a result of the measurement on a specimen in which an ink layer included in the clear region 306 (refer to FIGS. 2A, 2B, and 2C) is formed at the uppermost surface. The left diagram illustrates a result of the measurement on a specimen in which no ink layer included in the clear region 306 is formed.

As understood from the drawings, in the result on the right side among the two results illustrated in FIG. 5D, the spread of light is larger than that on the left side as understood from the picture of the specimen. In addition, in a manner corresponding to such a state, the skirt in the right diagram in the LSF measurement results spreads more than that in the left diagram. It can be thought that this result appropriately corresponds to the specimen configuration as described above. Thus, it can be thought from these results that, for example, the LSF measurement was appropriately performed by the above-described method. In addition, for example, with the LSF as the texture parameter, it can also be thought that the texture corresponding to transparent appearance is appropriately expressed.

The following describes the machine learning used in the present example in more detail. FIGS. 6A, 6B, and 6C are each a diagram for description of the machine learning used in the present example. FIG. 6A illustrates a model (arrangement prediction model) in which the layer configuration of ink layers is predicted by using the machine learning.

As described above, in the present example, the layer configuration corresponding to desired texture is acquired by using a computer having been caused to perform the machine learning of the relation between the layer configuration and the texture in advance. In this case, the computer having been caused to perform the machine learning may be, for example, another computer (for example, a cloud server) outside the building system 10. In this case, the control PC 14 (refer to FIGS. 1A, 1B, and 1C) in the building system 10 acquires an output representing the layer configuration through communication with the external computer. In a modification of the configuration of the building system 10, for example, the computer having been caused to perform the machine learning may be also used as the control PC 14.

In a case in which the computer having been caused to perform the machine learning is used, the computer is caused to perform the machine learning in advance by using the results of measurement on a plurality of specimens described above. More specifically, in the present example, the computer is caused to perform the machine learning of the layer configuration (ink-layer layering pattern, arrangement) of each specimen and a result of the LSF measurement on the specimen in association with each other. In the present example, the machine learning is machine learning using a neural network.

In addition, in this case, data including each of RGB components may be used as the result of the LSF measurement as described above. More specifically, in the present example, for example, an array in which LSF values are arranged in line in the order of RGB is used as an input. The specimens are divided to a plurality of positions, and neurons in a number corresponding to the number of positions are prepared as neurons of the neural network. In this case, for example, when each specimen has a size of 100×100, 300 neurons are prepared.

In addition, a value (layout value) representing the layer configuration may be used as an output. For example, in the present example, a number (color number) is associated with each of 14 colors as the sum of 10 colors in the color group corresponding to the inner skin region 302 (refer to FIGS. 2A, 2B, and 2C), three colors in the color group corresponding to the surface skin region 304 (refer to FIGS. 2A, 2B, and 2C), and one color used as the color of the clear region 306 (refer to FIGS. 2A, 2B, and 2C). Then, the color number is allocated to each of 10 ink layers formed in each specimen, thereby expressing the layer configuration in the specimen. In the experiment performed by the inventors of the present application, the color number of the clear color used in the clear region 306 was 1. In addition, the three colors illustrated in FIG. 3A were used as colors included in the color group corresponding to the surface skin region 304, and the color numbers of the colors were 2 to 4. In addition, the 10 colors illustrated in FIG. 3B were used as colors included in the color group corresponding to the inner skin region 302, and the color numbers of the colors were 5 to 14.

The neural network had a configuration in which neurons are completely connected with each other and four hidden layers are provided. Each hidden layer was made of 300 neurons having a ReLU activation function. In addition, a typical mean square error was used as a loss function. In addition, in this case, training was performed by setting the initial learning rate to be $10^{-3}$ and using a probabilistic optimization algorithm "Adam". In addition, training samples were extracted from a data set at random. In addition, the batch size was set to be 25, and the number of epochs was set to be 5000.

In the experiment performed by the inventors of the present application, under such conditions, error for each epoch was calculated by a mean square error function applied as the loss function of the model, and evaluation was performed. In this case, the mean square error function was calculated for each of the layout value predicted (estimated) by the established neural network and a correct arrangement value prepared as teacher data. Through this evaluation, it was checked that the error was converged to zero through about 700 times of repetition. In addition, the minimum value of the error was 0.000924, it was checked that the calculated was ended with the sufficiently reduced error.

In this manner, according to the present example, for example, a computer can be caused to perform appropriately the machine learning of the relation between the layer configuration and the texture. Then, in this case, the layer configuration corresponding to desired texture can be predicted (estimated) by using a result of the machine learning. In addition, the control PC 14 of the present example predicts, based on texture set to a CG image, the layer configuration corresponding to the texture.

More specifically, in this case, the control PC 14 produces, based on an instruction from a user, for example, a CG image to which texture corresponding to the transparent appearance of human skin is set. In this case, for example, a semi-transparent object may be produced for the CG image. The texture corresponding to the transparent appearance may be set by specifying, for example, the absorption coefficient and scattering coefficient of the object.

For example, when (R, G, B)=(700.0, 546.1, 435.8) is used as the wavelengths of RGB single-color light specified by CIE to reproduce typical texture of the skin of Asian, (R, G, B)=(2.2035, 5.3338, 12.1780) may be set as the absorption coefficient, and (R, G, B)=(191.2885, 381.5941, 774.3101) may be set as the isotropic scattering coefficient. These values are obtained by calculating the absorption coefficient of intrinsic melanin of a brown-black color and the absorption coefficient of pheomelanin of an orange-blown color, which are contained in the human skin, setting the contained ratio of intrinsic melanin to be 0.7, and calculating the absorption coefficient in a non-melanin region called a base line. In addition, in this case, the contained ratio at which the skin contains melanin including intrinsic melanin and pheomelanin is set to be 0.12. These values can be regarded as average values for Asian.

After such texture setting, the LSF corresponding to the texture is acquired through measurement by simulation. In this case, the LSF corresponding to the texture set to the CG image is an exemplary setting parameter. In addition, the setting parameter is, for example, the texture parameter corresponding to the texture set to the CG image. More specifically, in this case, the LSF corresponding to the texture is acquired by performing simulation in which the CG image to which the texture is set is irradiated with light (for example, a laser beam). In addition, similarly to the LSF used in the learning of the neural network, the acquired LSF corresponding to the texture of the CG image has the format of an array of 300 elements in which each of RGB components has 100 values.

In the simulation, linear light may be emitted similarly to a case in which, for example, the LSF measurement is performed on a specimen. In addition, in practical use, the LSF can be appropriately acquired from the transition of the pixel value by performing, for example, simulation in which the surface of the object illustrated in the CG image is irradiated with point light from a spot light. In this case, through the simulation in which point light is emitted, for example, a point spread function (PSF) may be calculated and the LSF may be calculated based on the point spread function.

In the present example, the LSF acquired in this manner is used as an input value to the neural network on which learning is performed as described above. Accordingly, the neural network is caused to output the layer configuration corresponding to the texture set to the CG image. FIG. 6B illustrates an exemplary layer configuration determined based on the output value from the neural network. In this case, the output obtained in this manner can be regarded as an exemplary output from the computer having been caused to perform the machine learning. More specifically, in the present example, the neural network outputs, in response to an input value representing the LSF corresponding to the texture set to the CG image, a layer number indicating each of the 10 ink layers to be deposited and a color number predicted for each layer in association with each other.

When the neural network is caused to perform learning as described above, an output value output from the neural network may be a fractional value including decimal places in some cases. However, in the present example, only an integer value is set as the color number as described above. Then, in this case, when the fractional value output from the neural network is directly used as the color number, for example, it may be difficult to determine the color corresponding to the color number. Thus, an integer value based on the fractional value output from the neural network may be employed as the color number used in the layer configuration determined based on the output value from the neural network. More specifically, in the present example, an integer value obtained by rounding the output value from the neural network is used as the color number used in the layer configuration determined based on the output value from the neural network. With this configuration, for example, the layer configuration corresponding to desired texture can be appropriately predicted by using the computer having been caused to perform the machine learning. The operation of determining the color number as an integer corresponding to the output value from the neural network can be regarded as, for example, the operation of selecting the color number of an integer nearest to the output value from the neural network.

In a specimen used in the present example, a plurality of ink layers is divided into the inner skin region 302, the surface skin region 304, and the clear region 306 (refer to FIGS. 2A, 2B, and 2C) and the colors thereof are set as described above. In this case, the regions are layered on each other in a predetermined order and divided so that ink layers included in the same region are layered one after another. However, in the output from the neural network, the layer number and the color number are not necessarily associated with each other in a manner corresponding to such region division.

In the determination of the layer configuration based on the output value from the neural network, adjustment processing may be performed so that the inner skin region 302, the surface skin region 304, and the clear region 306 are arranged in the stated order and the colors of ink layers included in each region are colors included in the color group corresponding to the region. In this case, for example, the average of a plurality of color numbers corresponding to a plurality of continuous layer numbers may be calculated for the output value from the neural network, and an integer value nearest to the average value may be set as the color number corresponding to these layer numbers. More specifically, in this case, for example, the range of layer numbers corresponding to each of the inner skin region 302, the surface skin region 304, and the clear region 306 is determined based on the output value from the neural network. Then, the average of the color numbers corresponding to the layer numbers corresponding to each region is calculated, and an integer value nearest to the calculated average value is set as the color number for the layer numbers corresponding to the region. With this configuration, for example, a layer configuration identical or similar to that of either specimen can be predicted as the layer configuration corresponding to desired texture. The above-described averaging operation can be regarded as, for example, the operation of determining the color number corresponding to each region by calculating the average over any incorrect color number as the color number of each ink layer included in the region. The layer configuration illustrated in FIG. 6B is an exemplary layer configuration determined through such averaging.

FIG. 6C illustrates an exemplary layer configuration prediction result. In the drawing, the left diagram illustrates a result of measurement of the LSF for an object in which ink layers are deposited in the layer configuration determined based on the output value from the neural network. The right diagram illustrates a result obtained by selecting a specimen having texture nearest to desired texture and measuring the LSF for the specimen. The right diagram can also be regarded as, for example, a result of the LSF measurement on a specimen having texture nearest to the texture corresponding to the LSF used for inputting to the neural network. In this case, the texture corresponding to the LSF used for inputting to the neural network is texture set to the CG image. The specimen having the texture nearest to the desired texture is visually selected from among a plurality of specimens each produced as an LSF measurement target. As can be understood from comparison of both drawings, the desired texture is appropriately reproduced for the layer configuration determined based on the output value from the neural network.

The following provides supplement description related to each configuration described above and the like. The description is first made on the configuration of the control PC 14 used in the present example in more detail.

Figure 7:
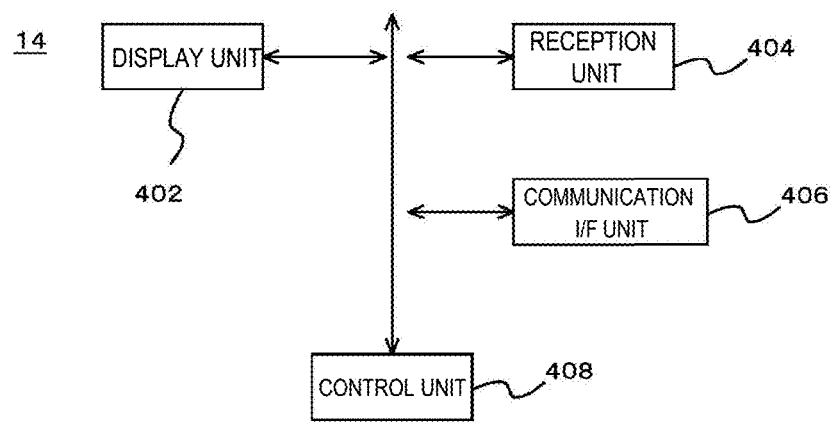
FIG. 7 is a diagram illustrating an exemplary configuration of a control PC 14.

FIG. 7 is a diagram illustrating an exemplary configuration of the control PC 14. In the present example, the control PC 14 includes a display unit 402, a reception unit 404, a communication I/F unit 406, and a control unit 408. As described above, the control PC 14 may be, for example, a computer configured to operate in accordance with a predetermined computer program. In this case, each component of the computer can operate as a component of the control PC 14.

The display unit 402 is a display device configured to display characters, images, and the like. For example, a monitor of the computer can be excellently used as the display unit 402. In the present example, the display unit 402 displays, for example, a CG image representing an object to be built at the building apparatus 12 (refer to FIGS. 1A, 1B, and 1C).

The reception unit 404 is an input device configured to receive an instruction from the user. For example, an input device (for example, a mouse or a keyboard) of the computer can be excellently used as the reception unit 404. In the present example, the reception unit 404 receives, from the user, for example, an instruction to set texture to the CG image being displayed on the display unit 402. In addition, in this case, the reception unit 404 receives setting of, for example, texture corresponding to transparent appearance as the texture.

The communication I/F unit 406 is an interface unit for performing communication between the control PC 14 and an external device. For example, a communication interface unit of the computer can be excellently used as the communication I/F unit 406. In the present example, the control PC 14 performs communication with the building apparatus 12 or another computer through the communication I/F unit 406. In this case, for example, supply of building data may be performed in the communication with the building apparatus 12. The communication with another computer may be, for example, communication with a computer having been caused to perform machine learning. In this case, by performing the communication with another computer through the communication I/F unit 406, the control PC 14 acquires, for example, a result of prediction of the layer configuration corresponding to the texture set to the CG image from the other computer. With this configuration, for example, the layer configuration prediction using a result of the machine learning can be appropriately performed.

The control unit 408 controls the operation of each component in the control PC 14. For example, a CPU of the computer can be excellently used as the control unit 408. In the present example, the control unit 408 operates in accordance with a predetermined computer program to function as a setting parameter calculation unit or a layer configuration acquisition unit. In this case, the setting parameter calculation unit is, for example, a component configured to calculate the setting parameter as the texture parameter corresponding to the texture set to the CG image. The layer configuration acquisition unit is, for example, a component configured to acquire the layer configuration corresponding to the setting parameter. In operation as the layer configuration acquisition unit, the control unit 408 acquires the layer configuration as described above by performing communication with the other computer through the communication I/F unit 406.

In the present example, the control unit 408 generates building data to be supplied to the building apparatus 12 based on a result of the acquisition of the layer configuration corresponding to the texture set to the CG image. Then, the control unit 408 supplies (outputs) the generated building data to the building apparatus 12 through the communication I/F unit 406. The generation of the object based on the acquisition result of the layer configuration is, for example, generation of the building data so that at least part of the configuration of the object becomes same as a configuration based on the acquired layer configuration. In this case, the control unit 408 can be a building data generation unit configured to generate the building data. With this configuration, for example, building of the object for which desired texture is reproduced can be appropriately performed at the building apparatus 12.

The following describe the process of a series of operations described above in more detail. In this case, the series of operations includes operations from a specimen producing operation to a building data outputting operation. The series of operations can be, for example, operations of predicting an ink-layer layering pattern for expressing texture set to a computer graphics image representing an object to be built at the building apparatus 12 and of generating building data based on a result of the prediction. As understood from the above description and the like, the series of operations can be divided into the operation of causing a computer to perform machine learning and the operation of performing layer configuration prediction by using a result of the machine learning. Thus, the following describes an exemplary series of operations with these divided operations.

Figure 8A:
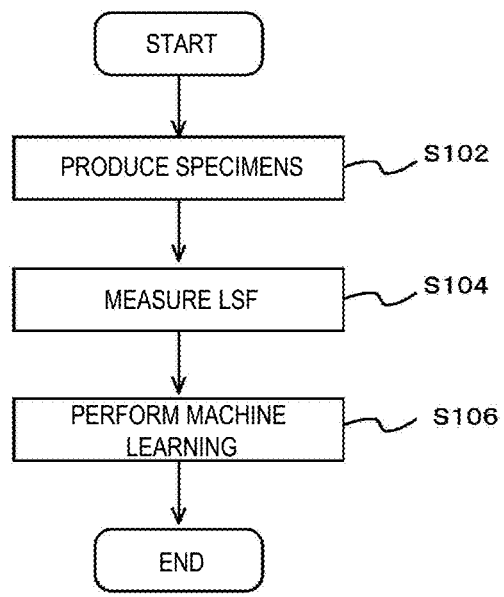
FIGS. 8A and 8B are each a diagram for description of a series of operations performed in the present example.
Figure 8B:
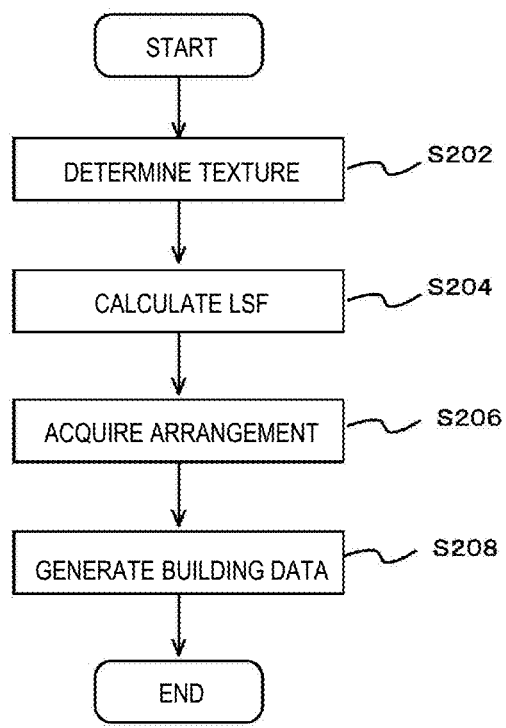

FIGS. 8A and 8B are each a diagram for description of the series of operations performed in the present example. FIG. 8A is a flowchart illustrating an exemplary operation for causing the computer to perform the machine learning. First in the operation, as described above with reference to, for example, FIGS. 3A, 3B, and 3C, a plurality of specimens in which ink layers are deposited in configurations different from each other are produced (S102). In this case, the operation at step S102 is an exemplary operation of a specimen production step. Then, the LSF measurement is performed on the produced specimens as described above with reference to, for example, FIGS. 4A and 4B (S104). In this case, the operation at step S104 is an exemplary operation of a specimen measurement step. In the present example, the LSF measurement operation can be regarded as, for example, an exemplary operation of performing, on each specimen, measurement to acquire the texture parameter.

After the LSF measurement is performed on the specimens, the computer is caused to perform machine learning of the relation between the configuration (layer configuration) of a plurality of ink layers in each specimen and a result of the LSF measurement as described above with reference to FIGS. 6A, 6B, and 6C and the like (S106). In this case, the operation at step S106 is an exemplary operation of a learning step. In the present example, the relation between the layer configuration of each specimen and the LSF measurement result is an exemplary relation between the specimen and the texture parameter. The operation at step S106 can also be regarded as, for example, the operation of causing the computer to learn the ink-layer layering pattern in each specimen and the LSF measured at step S104 in association with each other. With this configuration, for example, the computer can be caused to appropriately perform the machine learning of the relation between the layer configuration and the texture.

For example, before the building apparatus 12 is caused to build an object after the computer is caused to perform the machine learning in this manner, the layer configuration corresponding to desired texture is predicted by using a result of the machine learning as illustrated in, for example, FIG. 8B. In addition, building data is generated based on a result of the prediction.

FIG. 8B is a flowchart illustrating an exemplary operation of predicting the layer configuration by using the result of the machine learning. First in the operation of predicting the layer configuration, for example, the display unit 402 (refer to FIG. 7) of the control PC 14 displays a CG image representing the object, and the reception unit 404 (refer to FIG. 7) receives an instruction to specify texture from the user (S202). Accordingly, the control PC 14 sets the texture to the CG image. The setting of the texture to the CG image may be, for example, setting of the texture to at least part of the object illustrated in the CG image. In the present example, the texture set to the CG image is texture corresponding to transparent appearance as described above.

In addition, in this case, the control PC 14 produces, for example, a CG image representing the object based on stereoscopic data of the shape of the object, and displays the produced CG image on the display unit 402. In this case, for example, data of the shape of the object to be built and the like in a general-purpose format can be excellently used as the stereoscopic data. In a modification of the operation of the control PC 14, the control PC 14 may receive, from the outside of the control PC 14, a CG image to which texture is set in advance instead of receiving texture setting from the user.

Subsequently from the operation at step S202, the control PC 14 calculates, based on the CG image to which the texture is set, the setting parameter as the texture parameter corresponding to the texture set to the CG image (S204). In this case, the operation at step S204 is an exemplary operation of a setting parameter calculation step. At step S204, the setting parameter is calculated by performing simulation in which the CG image is irradiated with light as described above with reference to, for example, FIGS. 6A, 6B, and 6C.

After the setting parameter is calculated, the layer configuration (arrangement) corresponding to the setting parameter is acquired by using a result of causing the computer to perform the machine learning through the operation indicated in FIG. 8A (S206). In this case, the operation at step S206 is an exemplary operation of a layer configuration acquisition step. In addition, the operation at step S206 can also be regarded as, for example, the operation of predicting the ink-layer layering pattern corresponding to the setting parameter. More specifically, at step S206, the control PC 14 communicates with the computer having been caused to perform the machine learning and provides the setting parameter calculated at step S204 as an input to the computer. In this case, the provision of the setting parameter as an input is, for example, provision of the setting parameter expressed in a format that allows inputting to the neural network. Then, an output representing the layer configuration is acquired as an output in response to the input. The output can be, for example, information representing the ink-layer layering pattern corresponding to the setting parameter. With this configuration, for example, the layer configuration corresponding to the texture set to the CG image can be appropriately acquired by using a result of the machine learning. Accordingly, for example, the layer configuration corresponding to desired texture can be appropriately predicted. In this case, the control PC 14 can be regarded as, for example, a layer configuration prediction apparatus.

In the present example, after the prediction of the layer configuration corresponding to the desired texture, building data representing the object to be built is generated based on a result of the prediction (S208). In this case, the operation at step S208 is an exemplary operation of a building data generation step. At step S208, the control PC 14 generates, as the building data, for example, data for causing the building apparatus 12 to deposit ink layers in a layering pattern based on the layer configuration acquired at step S206.

As described above, according to the present example, for example, the layer configuration corresponding to the desired texture can be appropriately predicted. In addition, the building data based on a result of the prediction of the layer configuration is generated, and accordingly, for example, the object for which the desired texture is obtained can be appropriately built by the building apparatus 12.

In a modification of the operation of the building system 10, for example, the above-described specific features may be changed in various manners. For example, the above description is mainly made on operation when the LSF is used as a parameter representing transparent appearance. However, a parameter other than the LSF may be used as the parameter representing transparent appearance.

In addition, the above description is mainly made on operation when transparent appearance of the skin of a human being is used as texture in association with the layer configuration. However, various kinds of texture other than transparent appearance of the skin of a human being may also be used as the texture associated with the layer configuration. Such texture may be, for example, texture corresponding to a material such as jellyfish, jelly, a cut surface of a fruit, or a blade of a dragonfly, including image regions different from each other in color, density, and transparency from the surface of the object toward the inside. In such a case as well, the relation between the layer configuration and the texture can be appropriately associated with each other by selecting a parameter representing the texture as appropriate. In this case as well, a plurality of specimens having layer configurations different from each other may be produced to perform parameter measurement for each specimen as described above. In addition, the computer is caused to perform the machine learning of a result of the measurement in association with the layer configuration of each specimen, whereby it is possible to appropriately predict the layer configuration corresponding to the desired texture.

In addition, the above description has been mainly made on an example in which, in reproduction of the texture of the skin of a human being, the colored region 154 is divided into the inner skin region 302, the surface skin region 304, and the clear region 306 as described, for example, with reference to FIGS. 2A, 2B, and 2C. However, the manner of dividing the colored region 154 into a plurality of regions may be changed as appropriate in accordance with texture to be expressed. In this case as well, various kinds of texture can be appropriately reproduced by dividing the colored region 154 into a plurality of regions and associating each region with a color group. In this case, for example, a color set in accordance with a target object structure of the object to be built and the like may be used as a color included in each color group as described above. In addition, various parameters corresponding to the desired texture may be used as the texture parameters. More specifically, examples of the texture parameters include BRDF and BSSRDF.

Figure 9:
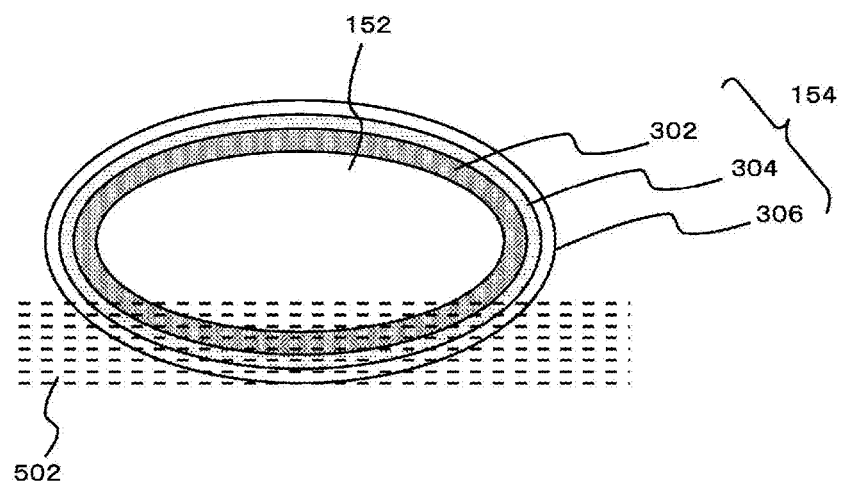
FIG. 9 is a diagram illustrating a more detailed exemplary configuration of the object 50.

The following describes, for example, the configuration of the colored region 154 for the object 50 built at the building apparatus 12 (refer to FIGS. 1A, 1B, and 1C) in more detail. FIG. 9 is a diagram illustrating a more detailed exemplary configuration of the object 50, and illustrates an exemplary configuration of a cross section of the object 50.

As described above, the building apparatus 12 builds, for example, the object 50 including the interior region 152 and the colored region 154 based on building data received from the control PC 14 (refer to FIGS. 1A, 1B, and 1C). In this case, the control PC 14 generates the building data based on a result of acquisition of the layer configuration corresponding to the texture set to the CG image as described above. Accordingly, the control PC 14 causes the building apparatus 12 to build the object 50 for which desired texture is reproduced.

With respect to the points mentioned above, when an attention is paid to the configuration of side surfaces of the object 50, the colored region 154 is formed along the side surfaces so that the thickness in the normal direction is constant as described above. In this case, the configuration of the colored region 154 is a configuration in which a plurality of layered regions along the side surfaces are layered on each other. Then, in this case, the layered regions along the side surfaces can be regarded as the ink layers 202 included in the colored region 154. Thus, when the colored region 154 including the inner skin region 302, the surface skin region 304, and the clear region 306 is formed as a configuration for reproducing the texture of the skin of a human being, the colored region 154 has, for example, a configuration in which the inner skin region 302, the surface skin region 304, and the clear region 306 are layered on each other in the normal direction of the object 50 as illustrated in the drawing. In this case, the inner skin region 302, the surface skin region 304, and the surface skin region 304 may be each formed so that layered regions corresponding to ink layers in each specimen used in the above-described machine learning are layered on each other.

In the present example, the building apparatus 12 builds the object 50 by the additive manufacturing as described above. In this case, the object 50 is built by layering ink layers each having a predetermined thickness in the deposition direction. More specifically, when each ink layer deposited by the additive manufacturing is defined as a building unit layer 502, a building operation by the additive manufacturing can be regarded as, for example, the operation of layering a plurality of building unit layers 502 each other to build the object as illustrated, for example, with a dashed line in the drawing. Then, in this case, the building unit layer 502 can be regarded as each ink layer 202 included in the colored region 154 on the upper and lower surface sides in the deposition direction as described above.

For the side surfaces other than the upper and lower surfaces, ink layers as components corresponding to layered regions layered on each other to reproduce texture can be different from the building unit layer 502. Thus, the ink layers as components corresponding to layered regions layered on each other to reproduce texture can also be, for example, layers corresponding to texture for distinction from the building unit layer 502. In this case, the operation of forming the colored region 154 at the building apparatus 12 can also be, for example, the operation of forming the colored region 154 by layering a plurality of layers corresponding to texture. In this case, the layers corresponding to texture may be divided into a plurality of regions colored with colors in mutually different color groups, such as the inner skin region 302, the surface skin region 304, and the clear region 306.

When such an object 50 is built at the building apparatus 12, for example, the operation of generating building data at the control PC 14 may determine the layering pattern of layers corresponding to texture as components of the colored region 154 based on the layer configuration of ink layers predicted by using machine learning. With this configuration, a result of prediction of the layer configuration can be appropriately applied to, for example, the side surfaces of the object 50 as well.

When texture is to be reproduced at higher accuracy for the side surfaces of the object 50, the layer configuration for reproducing the texture of the side surfaces may also be predicted separately from the layer configuration for the upper surface or the like. In this case, a plurality of specimens corresponding to the texture of the side surfaces may be additionally produced, and the computer may perform machine learning of the relation between the layer configuration and the texture in the specimens. In this case, for example, specimens having surfaces tilted at various angles may be produced, and the computer may perform the machine learning in association with the tilt angles of the surfaces of the specimens as well. With this configuration, the object 50 for which desired texture is reproduced can be built appropriately at higher accuracy.

Industrial Applicability

The present invention is excellently applicable to, for example, a layer configuration prediction method.

What is claimed is:

1. A layer configuration prediction method of predicting a layering pattern of layers of a building material to express a texture set to a computer graphics image representing an object to be built by a building apparatus configured to build the object by depositing layers of the material, the layer configuration prediction method comprising:

a specimen production step of producing a plurality of specimens by depositing layers of the material in configurations different from each other;

a specimen measurement step of performing, on each of the specimens, measurement to acquire a texture parameter corresponding to the texture;

a learning step of causing a computer to perform a machine learning of a relation between each of the specimens and the texture parameter, the machine learning causing the computer to learn the layering pattern of layers of the material in each of the specimens and the texture parameter measured in the specimen measurement step in association with each other;

a setting parameter calculation step of calculating, based on the computer graphics image to which the texture is set, a setting parameter as the texture parameter corresponding to the texture set to the computer graphics image; and a layer configuration acquisition step of predicting the layering pattern of layers of the material corresponding to the setting parameter, providing the setting parameter calculated at the setting parameter calculation step as an input to the computer having been caused to perform the machine learning, and acquiring an output representing the layering pattern of layers of the material corresponding to the setting parameter;

wherein the texture is determined by a layer configuration having the layering pattern of layers of the material;

wherein the texture is a transparent appearance expressed by depositing a plurality of layers of the material, and a function representing a light spreading pattern is used as the texture parameter.

2. The layer configuration prediction method according to claim 1, wherein the specimen production step produces each specimen by depositing a plurality of colored layers of the material, and each layer of the material in each specimen is colored with a color selected from among a plurality of colors different from each other.

3. The layer configuration prediction method according to claim 2, wherein the specimen production step prepares a plurality of color groups including a plurality of colors in combinations different from each other and selects either color in either color group as the color of each layer in each specimen, and produces each specimen so that layers of the material to which colors in the same color group are set are layered one after another.

4. The layer configuration prediction method according to claim 3, wherein the color groups include:

a first color group including a plurality of colors used as the colors of the layers of the material deposited on a lower side, and a second color group including a plurality of colors used as the colors of the layers of the material deposited on an upper side, and the specimen production step produces the specimens so that the layers of the material colored with colors in the second color group are positioned over the layers of the material colored with colors in the first color group.

5. The layer configuration prediction method according to claim 4, wherein the specimen production step produces the specimens expressing a color of a skin of a human being, and the second color group includes a plurality of colors corresponding to a color of a surface skin of the skin of the human being, and the first color group includes a plurality of colors corresponding to a color of an inner skin of the skin of the human being.

6. The layer configuration prediction method according to claim 1, wherein a line spread function (LSF) is used as the texture parameter.

7. The layer configuration prediction method according to claim 1, further comprising:

a building data generation step of generating a building data representing the object to be built, wherein the building data causes the building apparatus to deposit the building material in a layering pattern based on the layering pattern of layers of the material acquired at the layer configuration acquisition step.

8. A layer configuration prediction method of predicting a layering pattern of layers of a building material to express a texture set to a computer graphics image representing an object to be built by a building apparatus configured to build the object by depositing layers of the material, the layer configuration prediction method comprising:

a setting parameter calculation step of calculating, based on the computer graphics image to which the texture is set, a setting parameter as a calculated parameter corresponding to the texture set to the computer graphics image; and a layer configuration acquisition step of predicting the layering pattern of layers of the material corresponding to the setting parameter, providing the setting parameter calculated at the setting parameter calculation step as an input to a computer having been caused to perform a predetermined machine learning, and acquiring an output representing the layering pattern of layers of the material corresponding to the setting parameter, wherein a plurality of specimens is produced by depositing layers of the material in configurations different from each other, and the predetermined machine learning is a machine learning that causes the computer to learn the layering pattern of layers of the material in each of the specimens and the texture parameter measured in measurement to acquire the texture parameter in association with each other by using a result obtained by performing, on each of the specimens, a measurement to acquire a texture parameter corresponding to the texture;

wherein the texture is determined by a layer configuration having the layering pattern of layers of the material;

wherein the texture is a transparent appearance expressed by depositing a plurality of layers of the material, and a function representing a light spreading pattern is used as the texture parameter.

\* \* \* \* \*